W. B. SCAIFE.

Metallic Vessels.

No. 6,391. Reissued April 20, 1875.

Witnesses.
John Becker.
Jno. Waynes

Wm. B. Scaife
by his Attorneys
Brown & Allen

UNITED STATES PATENT OFFICE.

WILLIAM B. SCAIFE, OF PITTSBURG, PENNSYLVANIA.

IMPROVEMENT IN METALLIC VESSELS.

Specification forming part of Letters Patent No. 23,014, dated April 24, 1860; extended seven years; reissue No. 6,391, dated April 20, 1875; application filed January 7, 1875.

DIVISION A.

*To all whom it may concern:*

Be it known that I, WILLIAM B. SCAIFE, of the city of Pittsburg, in the county of Allegheny and State of Pennsylvania, have invented a new and useful Improvement in Wrought-Iron Casks or Barrels; and I do hereby declare that the following is a full, clear, and exact description of the same, reference being had to the accompanying drawings, forming a part of this specification, in which—

Figure 1:
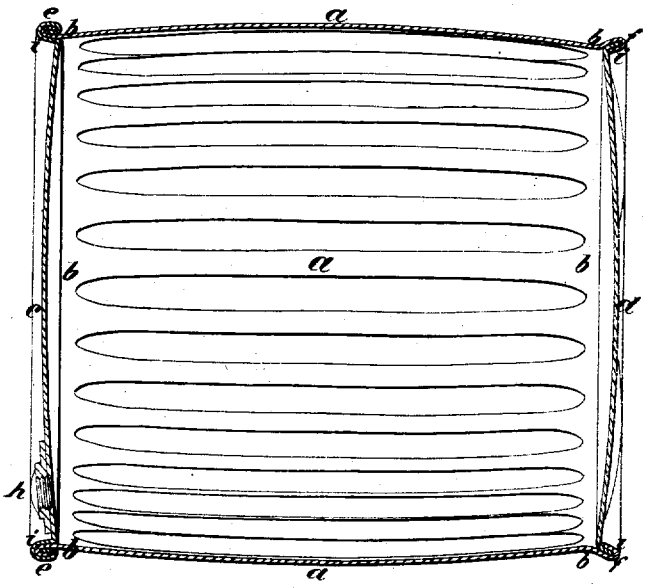
Figure 2:
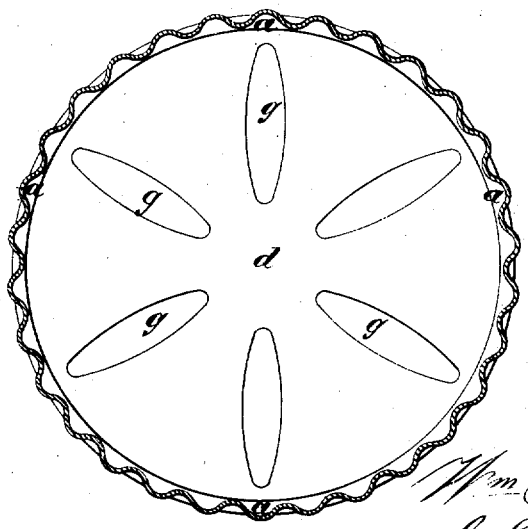

Figure 1 is a longitudinal section of a cask constructed according to my invention. Fig. 2 is a tranverse section of the same.

Similar letters of reference indicate corresponding parts in both figures.

My invention consists in a novel construction of sheet-iron casks, barrels, or kegs, for coal oil or other substances, whereby I am enabled to combine facility of construction with extreme lightness and strength, in the form most desirable for transportation.

To enable others skilled in the art to make and use my invention, I will proceed to describe it in detail, with reference to the accompanying drawings.

The sides are made with longitudinal corrugations, as indicated by *a a* in both figures of the drawing; but as it would be very difficult, if not impossible, to attach the heads securely if these corrugations extended the whole length, I make them of gradually-diminishing depth in each direction from the middle of the length of the cask, so that they vanish into a plain part, *b b*, which is left at each end for the purpose of forming lap-joints *e f* with heads *c d*. The lap-joints may be of either of the forms represented in Fig. 1, where a different kind of joint is shown at each end, or of any other construction in which the lap is made to project longitudinally beyond the heads in a manner corresponding with the chime of a wooden cask, as illustrated at *i i* in Fig. 1. The lap-joints may be made tight by soldering. The heads may be flat or convex, or corrugated radially, as shown *g g*, in Fig. 2; but must be plain near their edges to enable the joints with the sides to be formed with facility. The sides may be composed of as many sheets as may be requisite, united by lap-seams running lengthwise of the cask and closed by soldering.

One of the heads is fitted with a screw-bung, *h*, which is to be removed and replaced by a cock when the contents of the cask are to be drawn off.

By the longitudinal corrugation of the sides of the cask, great strength is obtained with comparatively light plates, and by the peculiar form of the corrugations the bilge is obtained, which enables the cask to be rolled about with facility, and facility is obtained for making lap-joints with the heads, while, by the extension of the lap joints beyond the heads in the form of the chime of a wooden cask, the necessary convenience is afforded for handling it.

I do not claim the making of casks, barrels, or kegs, of corrugated metal in any other manner than that herein specified; but

I claim as my invention, as a new article of manufacture—

A cask, barrel, or keg, made of sheet-iron, having its sides corrugated longitudinally, in the manner described, to produce a bilge, and leave the parts near the heads plain, and united with the heads by lap-joints, which extend beyond the heads in the form of a chine, as herein described.

W. B. SCAIFE.

Witnesses:

W. N. PAXTON,

JAMES J. JOHNSTON.